United States Patent Office 3,058,347
Patented Oct. 16, 1962

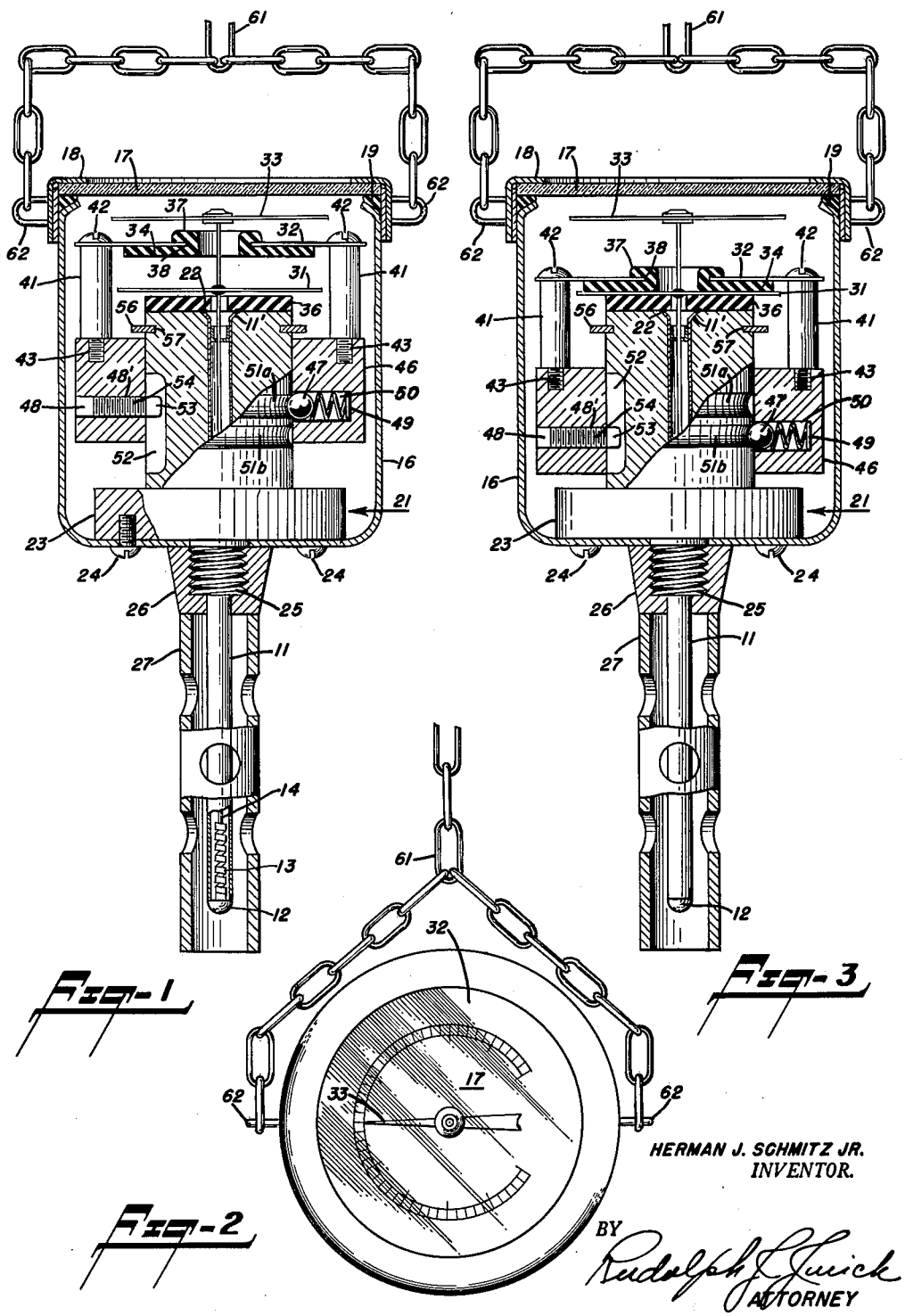
Oct. 16, 1962     H. J. SCHMITZ, JR     3,058,347
TANK THERMOMETER
Filed June 27, 1960
HERMAN J. SCHMITZ JR.
INVENTOR.

1

3,058,347
TANK THERMOMETER
Herman J. Schmitz, Jr., Mountainside, N.J., assignor to Daystrom, Incorporated, Murray Hill, N.J., a corporation of Texas
Filed June 27, 1960, Ser. No. 38,973
6 Claims. (Cl. 73—363.9)

This invention relates to a thermometer for measurement of the temperature of a liquid within a tank, and more particularly, to a thermometer incorporating novel means for obtaining an accurate reading of the temperature of the liquid at a desired level within the tank.

Thermometers for the measurement of the temperature of a liquid at any desired level within a tank are well known and may include a bimetallic element having a staff which carries a pointer coopering with a scale of temperature on a scale plate. A chain is secured to the thermometer whereby the device may be lowered into the liquid to any desired depth. The thermometer is suspended in the liquid for a sufficient period for the bimetallic member to assume the temperature of the liquid. Locking means are included in the thermometer for locking the scale in fixed position whereby the temperature indication is not affected as the thermometer is raised through the fluid and removed from the tank. Such locking means may be actuated by imparting a sharp jerk to the chain before raising the thermometer. My invention relates to a novel locking system which employs fewer parts than are normally incorporated in prior art devices, which locking means holds the pointer more securely in place, and which thermometer is easier to assemble than prior art devices of this general type.

An object of this invention is the provision of a tank thermometer which affects an accurate indication of the temperature of the liquid at any desired depth within the tank.

An object of this invention is the provision of a bimetallic tank thermometer having an indicating mechanism which may be simply but securely locked in position while submerged to a desired depth within a liquid contained in a tank.

An object of this invention is the provision of a bimetallic tank thermometer having a staff carrying a pointer cooperating with a scale plate having a scale of temperature values thereon, a locking disc secured to the said staff, a generally cylindrical-shaped hub, an inertia-responsive mass impositively latched for sliding movement on the hub, means securing the scale plate to the said mass, and resilient cushioning material secured to the bottom of the scale plate, the said cushioning means being movable into engagement with the said locking disc upon movement of the said mass to a locking position.

These and other objects and advantages of the invention will become apparent from the following description when taken with the accompanying drawings. It will be understood that the drawings are for purposes of illustration and are not to be construed as defining the scope or limits of the invention, reference being had for the latter purpose to the claims appended hereto.

In the drawings wherein like reference numerals denote like parts in the several views:

FIGURE 1 is a substantially vertical sectional view through a tank thermometer embodying my invention;

FIGURE 2 is an end elevational view of the thermometer; and

FIGURE 3 is similar to FIGURE 1 only showing the indicating mechanism in locked position.

Reference is first made to FIGURES 1 and 2 of the drawings wherein the reference numeral 10 identifies a tubular stem 11 closed at the lower end by a plug 12 which is suitably welded, or otherwise attached thereto. A helical bimetallic coil 13 is secured at one end thereof to the plug 12 as by brazing, soldering, welding, or the like. The other end of the bimetallic element is fastened to a staff 14 which extends into the head of the thermometer comprising a case 16 provided with a transparent window 17 of glass, plastic, or other material, which window is fixedly secured over the open end of the case by a clamping ring 18 secured to the case by any suitable means not shown. A resilient gasket 19 provides a water-tight seal thereat.

The tubular stem 11 extends through an axial hole in a substantially cylindrical-shaped hub 21, said stem including an upper flared end 11', which is welded to the hub, the welded joint being indicated by the reference numeral 22. The hub 21 is provided with a radial integral outwardly extending flange 23 which abuts the inner side of the generally plane bottom wall of the case 16. Screws 24 extend through holes in the bottom of the case and threadedly engage tapped holes formed in the flange 23 to fixedly secure the hub to the case. The hub 21 includes, also, a threaded end 25, which extends through a central opening in the base of the case 16. A stem protector comprising a nut 26 threaded to the hub portion 25, and a perforated tube 27, welded, or otherwise secured to the nut 26, protects the stem 11 from physical damage.

The novel indicator locking means of this invention includes a locking disc 31, which is secured to the staff 14 between the hub 21 and an apertured plate 32 which, in the illustrated embodiment of the invention, comprises a scale plate over which a pointer 33 secured to the staff 14 operates. Locking cushions 34 and 36 are secured, as by cementing, or any other suitable means, to the bottom surface of the scale plate and the top surface of the hub 21, respectively, the locking cushions being made of resilient material, such as rubber, or the like. In the illustrated embodiment, the upper locking cushion 34 includes an upwardly extending flange portion 37 having an annular groove 38 formed therein within which groove the inner periphery of the apertured scale plate 32 extends. The scale plate 32 is mounted upon uprights 41 by means of screws 42 extending through suitable holes in the scale plate and which threadedly engage tapped holes in the uprights. The lower end of each of the uprights is provided with an integral threaded stud portion 43 threadedly engaging tapped holes in an inertia mass or cylinder 46.

The inertia mass, or cylinder 46, is slidably mounted on the hub 21 and impositively latched in one of two alternative positions by a ball 47 mounted in a transverse bore 50 of the cylinder and resiliently biased by a spring 49 into one of two depressions 51a or 51b formed on the hub. For ease of manufacture, such depressions may comprise circumferential grooves, as shown. Since the scale plate 32 is secured to the inertia mass 46, it will be apparent that for accurate temperature readings, relative rotation of the inertia mass must be prohibited. To this end, a longitudinal groove, or keyway 52, is formed in the hub 21, within which groove the end 53 of a pin or screw member 54 slidably fits. In the drawings, the member 54 is shown comprising a screw which engages a tapped portion 48' of a hole 48 in the said inertia member 46. Longitudinal travel of the inertia mass or cylinder 46 on the hub is limited in the upward direction by a split ring 56, which fits within an annular groove 57 in the hub 21, and in the downward direction by the flange 23 formed adjacent the lower end of the hub.

A chain 61 for suspending the thermometer in a tank is shown attached to eye hooks 62 welded to the ring 18.

In order to obtain a temperature reading of a liquid at a desired depth within a tank, the assembly, with the ball detent 47 in the recess 51a, as illustrated in FIGURE 1, is lowered to the desired level within the tank and there suspended for a sufficient period for the bimetallic member to assume the temperature of the liquid. A sharp jerk is then imparted to the chain 61 and the inertia cylinder 46 forces the latch ball 47 out of the upper grooves 51a in the hub 21 and into the lower groove 51b, as shown in FIGURE 3. Referring, now, to FIGURE 3, it will be seen that the locking disc 31, secured to the staff 14, is clamped between the locking cushion members 34 and 36. There is sufficient resiliency in the bimetallic element 13 to permit the staff 14 with the attached disc 31 to be moved axially downwardly to a position wherein the said disc is firmly clamped between the said locking cushions. This locks the pointer 33 against movement with respect to the scale plate 32 and the instrument may be raised from the liquid without movement of the pointer by the bimetallic element as the thermometer is raised for removal from the tank.

To release the locking disc 31 from between the cushions 34 and 36, the casing is held face down and the chain end of the casing is brought down briskly on the palm of the hand, thereby moving the cylinder 46 and attached scale plate away from the flanged end 23 of the hub to restore the movable parts to their respective normal positions, as shown in FIGURE 1. It will be understood that the staff 14 and attached locking disc 31 move upwardly, as viewed in FIGURE 1, by reason of the resiliency of the helical bimetallic spring 13 whereby a clearance space is provided between the disc 31 and lower cushion 36 to permit the uninhibited rotation of the staff and pointer by the bimetallic element in the disengaged position.

Having now described my invention in detail, in accordance with the requirements of the patent statutes, various changes and modifications will suggest themselves to those skilled in this art. For example, instead of placing the scale markings on the plate 32, a second plate may be added between the pointer 33 and the plate 32, as viewed in FIGURE 1, which plate is suitably secured to the casing 16 along the outer periphery. The scale markings would then be included on such plate. Further, the invention is not limited to the particular ball detent mechanism shown, or to the particular screw means 54 for preventing relative rotary movement of the cylinder 46 on the hub 21. It is intended that the above and other such changes and modifications may be made without departing from the scope and spirit of the invention as recited in the following claims.

I claim:

1. In a bimetallic tank thermometer of the type including a hollow stem housing a staff carrying an indicating member with a casing and supporting means for suspending said thermometer within a tank, a locking disc secured to said staff, inertia-responsive means housed within said casing, means mounting a resilient cushion member on the said inertia-responsive means, the said cushion member normally being spaced from the said disc, the inertia-responsive means being movable to a locking position wherein the said cushion member engages the said disc to prevent angular rotation thereof.

2. The invention as recited in claim 1 including a second resilient cushion member within the casing and normally positioned a spaced distance from the said disc on the side opposite the said cushion member mounted on the inertia-responsive device, the said disc being moved into engagement with the said second cushion member in the locking position of the inertia-responsive means.

3. The invention as recited in claim 1 wherein the means mounting a resilient cushion member on the said inertia-responsive means comprises a scale plate, the said resilient cushion member being secured to the bottom of the said scale plate.

4. The invention as recited in claim 3 including a hub mounted within the casing and secured thereto, the said inertia responsive means comprising a cylinder axially movable on the said hub, means preventing relative rotation between the said hub and cylinder, and releasable means impositively latching said inertia means in an unlocked and the locking positions.

5. The combination with a bimetallic tank thermometer including a hollow stem having a staff, a casing, a pointer secured to the staff, and suspension means for lowering said stem and casing into a medium whose temperature is to be measured; of a hub within the casing through which the staff extends, an inertia-responsive means slidably and non-rotatably mounted on the hub and movable between locking and unlocking positions, a scale plate, means attaching the scale plate to the inertia-responsive member a spaced distance therefrom, a locking disc secured to the staff within the casing between the said hub and scale plate, locking cushions secured to the facing surfaces of the said scale plate and hub, the said staff and attached disc being free for angular movement in the unlocked position of the inertia-responsive means, the said disc being clamped between the said locking cushions to prevent rotation of the staff in the locking positions of the inertia-responsive means.

6. The invention as recited in claim 5 including means impositively latching the said inertia-responsive means against movement with the said hub in the said locking and unlocked postions, the said inertia-responsive means being moved from the unlocked position to the locking position upon a jerk being applied to the suspension means.

References Cited in the file of this patent

UNITED STATES PATENTS

| | | |
|---|---|---|
| 1,665,058 | Hanna | Apr. 3, 1928 |
| 2,568,245 | McDonald | Sept. 18, 1951 |
| 2,733,519 | Murata | Feb. 7, 1956 |
| 2,743,611 | Freeman | May 1, 1956 |
| 2,743,612 | Kebbon et al. | May 1, 1956 |
| 2,918,819 | Freeman | Dec. 29, 1959 |